United States Patent [19]
Oya

[11] Patent Number: 4,566,039
[45] Date of Patent: Jan. 21, 1986

[54] FACSIMILE SYSTEM
[75] Inventor: Koichi Oya, Kokubunji, Japan
[73] Assignee: Tokyo Shibaura Denki Kabushiki Kaisha, Kawasaki, Japan
[21] Appl. No.: 378,734
[22] Filed: May 17, 1982
[30] Foreign Application Priority Data May 20, 1981 [JP] Japan .................................. 56-74879

[51] Int. Cl.$^4$ ............................................. H04N 7/04
[52] U.S. Cl. .................................... 358/280; 358/263; 382/57
[58] Field of Search ................ 358/263, 261, 256, 257, 358/280; 382/42, 56, 57; 356/256

[56] References Cited

U.S. PATENT DOCUMENTS

| | | |
|---|---|---|
| 3,271,738 | 9/1966 | Kamentsky ........................... 382/57 |
| 4,034,343 | 7/1977 | Wilmer ................................. 382/23 |
| 4,091,424 | 5/1978 | Widergren .......................... 358/260 |
| 4,410,916 | 10/1983 | Pratt et al. ......................... 358/263 |
| 4,414,579 | 11/1983 | Dattilo et al. ...................... 358/256 |

FOREIGN PATENT DOCUMENTS

| | | |
|---|---|---|
| 1208925 | 1/1966 | Fed. Rep. of Germany . |
| 1549686 | 9/1975 | Fed. Rep. of Germany . |
| 50-46226 | 4/1975 | Japan . |
| 00-72278 | 5/1980 | Japan ..................................... 382/57 |
| 00-35275 | 4/1981 | Japan ..................................... 382/57 |
| 1175391 | 12/1969 | United Kingdom . |

Primary Examiner—Edward L. Coles, Sr.
Attorney, Agent, or Firm—Cushman, Darby & Cushman

[57] ABSTRACT

A facsimile signal transmitted from a transmission side facsimile device is received by a receiving side facsimile device and is converted into a document character pattern data. The character pattern data is supplied to a character recognizing section where it is subjected to a character recognition process. A character which can not be recognized by the character recognizing section is processed as it is intact, while the recognized character is converted into a standard character. A document containing the unrecognizable character is hard copied for reservation.

31 Claims, 11 Drawing Figures

FIG. 7

FACSIMILE SYSTEM

BACKGROUND OF THE INVENTION

The present invention relates to a facsimile system and more particularly to a character recognizing facsimile system with a character recognizing function.

In a facsimile system for transmitting documents, it is a common practice that characters on a document are transmitted between facsimile terminal equipments, as they are intact irrespective of types of the characters such as handwritten or printed characters. An OCR facsimile system has recently been developed, containing a facsimile system for recognizing characters on documents and printing them. In the OCR type of the facsimile system, when a character transmitted can not be recognized, this character is displayed on a CRT (cathode ray tube) and recognized, corrected and keyed in by an operator. According to this correcting method of the machine-unrecognized character, if the character is erroneously corrected, the character before correction can not be understood since the duplicate document containing the uncorrected character is not prepared. This results in a confusion in reading the document containing such character.

SUMMARY OF THE INVENTION

Accordingly, an object of the present invention is to provide a character recognizing facsimile system which, when an unrecognizable character is encountered in the facsimile operation, can produce a duplicate document containing the unrecognizable character.

In a character recognizing facsimile system according to the present invention, document data transmitted is inputted into an OCR. In the OCR, it is recognized and an unrecognizable character is processed as it is in an unrecognizable state. An output device produces document data containing recognized and unrecognizable characters in the form of a duplicate document printed.

DETAILED DESCRIPTION OF THE PREFERRED EMBODIMENT

Figure 1:
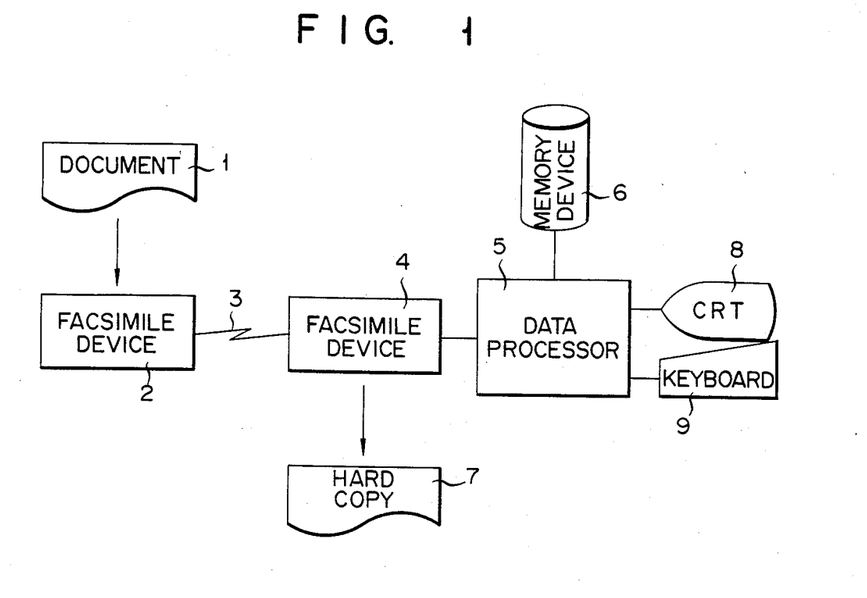
FIG. 1 shows a block diagram of an embodiment of a facsimile system according to the present invention.

A transmission side facsimile device 2 into which a document 1 is set is coupled through a data transmission line 3 to a receiving side facsimile device 4 which is further coupled with a data processor 5 for performing the data processing such as character recognition. The data processor 5 is connected to a memory device 6, a CRT 8 and a keyboard 9.

Figure 2:
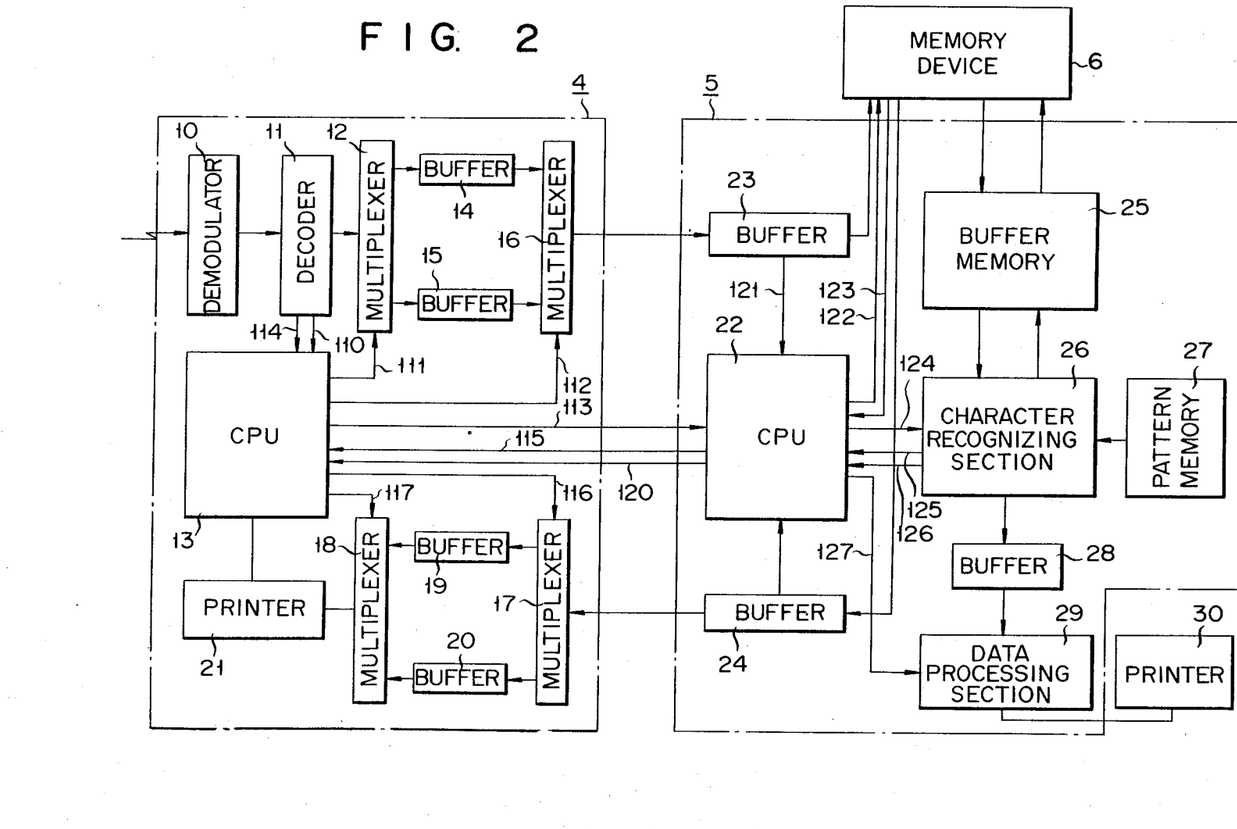
FIG. 2 shows a block diagram of a receiving section of the facsimile system shown in FIG. 1.

Turning now to FIG. 2, there is shown a receiving side facsimile terminal equipment. In the receiving side facsimile equipment, the receiving side facsimile device 4 is provided with a demodulator 10 connected to a transmission side facsimile device 2 through a data transmission line 3. The output terminal of the demodulator 10 is connected to the input terminal of the decoder 11. The output terminal of the decoder 11 is connected to an input terminal of a multiplexer 12 and an input section of control section 13 made up of a CPU, for example. The output terminals of the multiplexer 12 are connected to input terminals of buffer memories 14 and 15. The output terminals of the buffer memories 14 and 15 are connected to the input terminal of the multiplexer 16. The CPU 13 is connected to the control signal input terminal of multiplexers 12, 16, 17 and 18. The output terminal of the multiplexer 17 is connected to the input terminal of the multiplexer 18 through buffers 19 and 20. The output terminal of the multiplexer 18 is connected to the input terminal of a dot printer 21, for example.

The CPU 13 is connected to a CPU 22 of a data processor 5 in a bidirectional transmission manner, and the CPU 22 is connected to buffer memories 23 and 24 for their timing control. The buffer memory 23 is connected at the input terminal to the output terminal of the multiplexer 16 and at the output terminal to the memory device 6. The memory device 6 is coupled with a character recognition section 26 by way of a buffer 25. The character recognition section 26 is connected to a pattern memory 27 for storing character pattern data corresponding to a standard character. The output terminal of the character recognition section 26 is connected to a data processing unit, or a CPU 29, by way of a buffer 28. The CPU 29 is connected to the CPU 22 so that the former is controlled by the latter. The CPU 22 is also connected to the memory device 6 and the character recognition section 26 for executing the data read and write and a character recognition control.

The operation of the facsimile system will be described referring to flow charts shown in FIGS. 4 to 7.

Figure 3A:
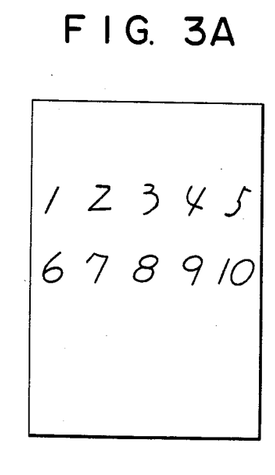
FIGS. 3A to 3C show a transmitting document and received documents.

When a document 1 bearing handwritten characters as shown in FIG. 3A is set in the transmission side facsimile device 2 and a start button (not shown) is operated, the facsimile device 2 optically reads the document 1 and transmits the document data in the form of facsimile signal to the data transmission line 3. The facsimile signal is inputted to the demodulator 10 of the receiving side facsimile device 4 through the transmission line 3. The facsimile signal is demodulated and inputted into the decoder 11. The decoder 11 decodes the demodulated signal into character pattern data. The decoder 11 loads the character pattern data into a buffer memory 14, for example, through the multiplexer 12. The CPU 13 checks the generation of a buffer switching signal 110 from the decoder 11. When the decoder 11 transfers the character pattern data of one scanning line to the buffer memory 14, the decoder 11 generates the buffer switching signal 110. Upon receipt of the signal 110, the CPU 13 supplies switching signals 111 and 112 to the multiplexers 12 and 16. The multiplexers 12 and 16 respond to the signals 111 and 112 to switch the input/output terminals of the memories 14 and 15. Then, the data stored in the buffer memory 14 is transferred through the multiplexer 16 to the buffer memory 23 of the data processor 5. The buffer memory 15 is supplied with character pattern data corresponding to the next scanning line from the decoder 11 through the multiplexer 12. At this time, the CPU 13 transfers a pattern data transmitting signal 113 to the CPU 22 of the data processor 5. The CPU 22 acknowledges the signal 113 from the CPU 13 in the receiving side facsimile device 4 to check whether the buffer memory 23 is in a full loaded state or not. When the buffer memory 23 is fully loaded, the CPU 22 generates a command signal 122 to transfer the data stored in the buffer memory 23 to the memory device 6 to execute such operation. When the character data of one scanning line is transferred from the buffer memory 14 of the receiving side facsimile device 4 and the character pattern data is stored in the buffer memory 15, the decoder 11 produces again the buffer switching signal 110 and the CPU 13 controls the multiplexers 12 and 16 so as to switch the buffer memories 14 and 15. In this way, the character pattern data is transferred to the buffer memory 23 of the data processor 5 every scanning line. When the decoder 11 completes the output of the pattern data of one page, the decoder 11 produces a page end signal 114. Responding to the signal 114, the CPU 113 stops the generation of the pattern data transmitting signal 113. When acknowledging the stop of the signal 113, the CPU 22 transmits an index code, e.g. page and row number, to the memory device 6 and terminates the data transfer to the memory device 6. Then, the CPU 22 gives the pattern data request to the memory device 6, so that transferred from the memory device 6 to the buffer memory 25. Everytime one line pattern data is processed, the CPU 22 checks whether or not the character pattern data of one page has been transferred. At this time, such data transfer is not completed yet, so that the CPU 22 checks a document data input/output completion status of the memory device 6 on the basis of the signal 123. After checking the input/output completion status, the CPU 22 transfers a recognition start signal to the character recognition section 26. The recognition section 26 responds to a recognition start signal 124 and responds to the recognition start signal 124 to perform the character recognition according to the flow chart shown in FIG. 6. When receiving the recognition start signal 124, the recognition section 26 stops the output of a recognition end signal 125 and an recognizable signal 126. Then, the pattern data of one character is read out from the buffer memory 25 and is compared with the standard pattern data from the pattern memory 27, so that the pattern recognition is performed in a usual manner. When the character recognition section 26 recognizes the character of the pattern data inputted, that is, a character code of the pattern recognized, for example, "1", is recognized, the character code representing "1" is stored in the buffer memory 28. A standard pattern corresponding to a character pattern recognized is read out from the standard pattern memory 27, and is stored into a corresponding location in the buffer memory 25. In this way, characters "1" to "4" on the document 1 in FIG. 2 have smoothly been recognized but a character "5" cannot be recognized. In this situation, the recognition section 26 inputs a signal 126 representing presence of the unrecognizable character is inputted to the CPU 22. In this way, the document data of one line has been processed. Upon the completion of the document data processing, the recognition section 26 supplies a recognition end signal 125 to the CPU 22.

Figure 3B:
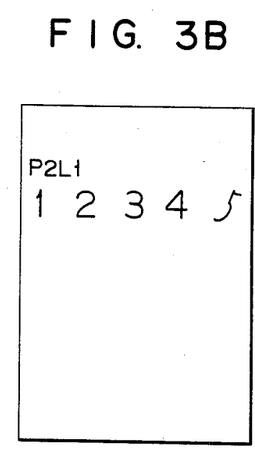

The CPU 22 accepts the recognition end signal 125 and acknowledges the signal representing presence of the unrecognizable character. At this time, the CPU 22 gives a pattern data input request to the memory device 6, as indicated by the flow chart shown in FIG. 5B. When the pattern data input/output completion status is transferred from the memory device 6 to the CPU 22, the CPU 22 gives the one line pattern data output request to the memory device 6. When the CPU 22 ascertains that the document data input/output completion data status is inputted, the CPU 22 transfers the data transmitting signal 115 to the CPU 13 of the receiving side facsimile device 4. When receiving the signal 115, the CPU 13 transfers the switching signals 116 and 117 to the multiplexers 17 and 18 and at the same time transfers a print request signal 118 to the dot printer 21. As a result, the document data is supplied from the buffer 24 to the dot printer 21 alternately through the buffers 19 and 20, every scanning line. When the CPU 22 recognizes the signal 126 representing the presence of the unrecognizable character, the pattern data of the line having an unrecognizable character is produced from the memory device 6. Therefore, the dot printer 21 prints out the line including the unrecognizable character "5" together with an index code "P2L1", as shown in FIG. 3B.

Following the processing of the document data of the first line, the second document data of the second line is processed in a similar way. When all the characters are recognized containing no unrecognizable character, all the character codes of the second line are stored in the buffer memory 28. In this way, when the document data of one page is processed, the CPU 18 supplies a data processing start signal 127 to the CPU 29, as described in the flow chart shown in FIGS. 5A and 5B. The CPU 29 responds to the start signal 127 to fetch the character codes of the buffer memory 28 and to arithmetically operate the character codes. The result of the arithmetic operation is printed out by the printer 30.

When the processing of the pattern data of one page is completed, the pattern data of two and subsequent pages are processed in a similar way. Through the processing, the processed pattern data of all the pages are stored in the memory device 6, the pattern data, i.e. character pattern, is read out from the memory device 6, when necessary, and printed out. At this time, the pattern data containing the unrecognizable character is retrieved using an index code "P1L2" on a hard copy printed out by the dot printer 21 shown in FIG. 3B. The retrieved one is displayed on a CRT 8. An operator judges the unrecognizable character on the basis of the recognizable character pattern on the hard copy and corrects the unrecognizable character by an input signal keyed-in from the keyboard 9.

As described above, according to the present invention, when an unrecognizable character is present in the document, this character is hard copied as it is. Accordingly, an operator can recognize the unrecognizable character and correct the pattern data nonerroneously.

Figure 3C:
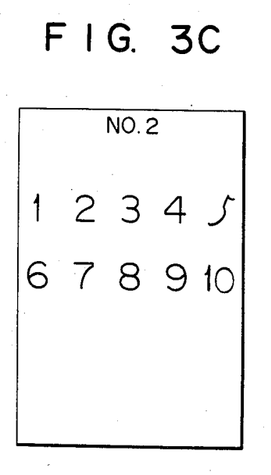
Figure 4:
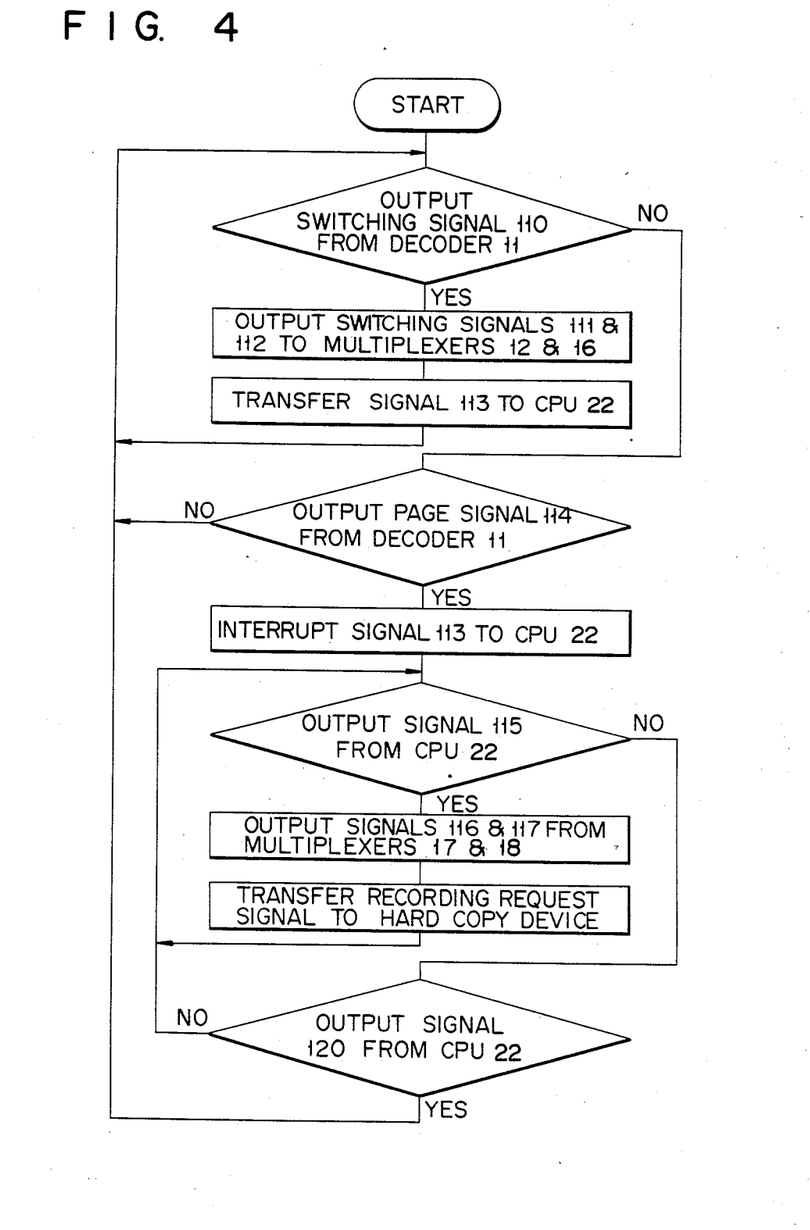
FIGS. 4, 5A, 5B, 5C, 6 and 7 illustrate flow charts useful in explaining the operations at key portions of the facsimile system shown in FIG. 1.
Figure 5A:
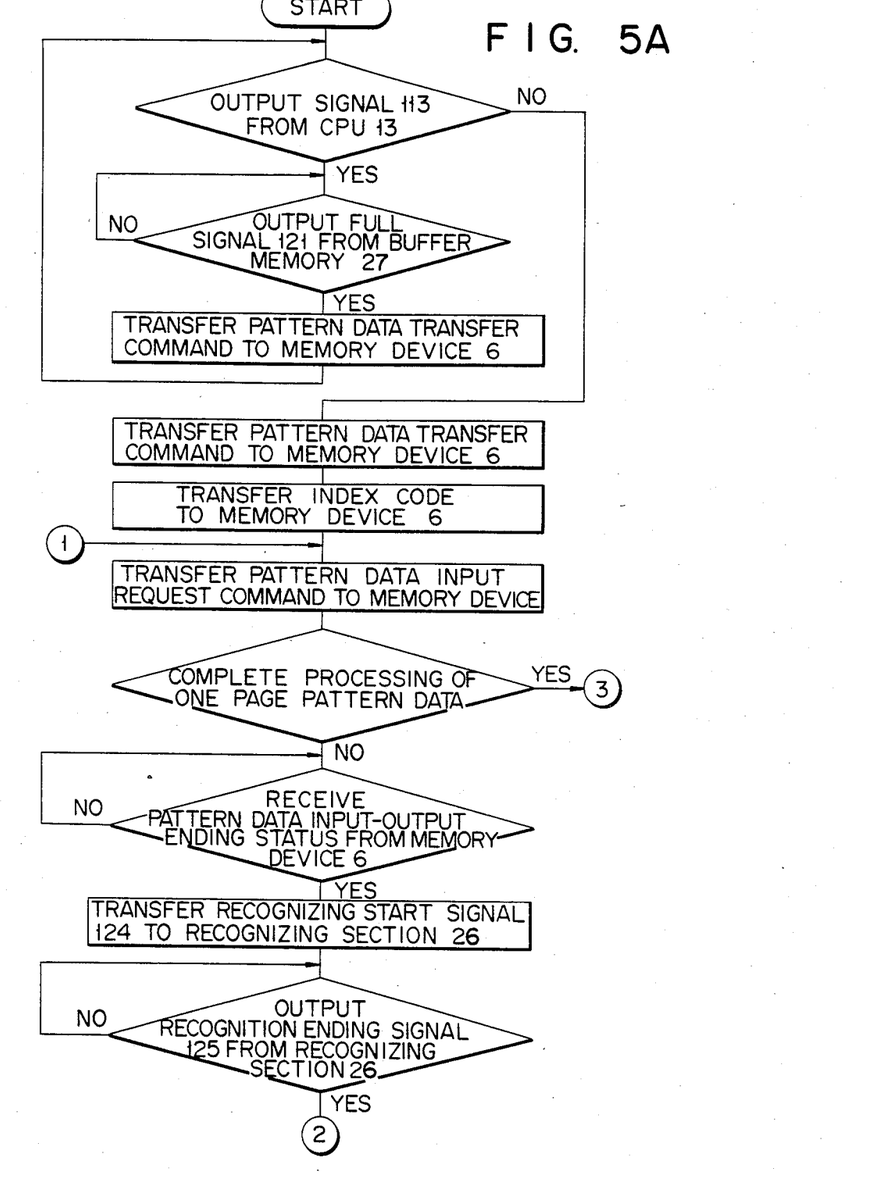
Figure 5B:
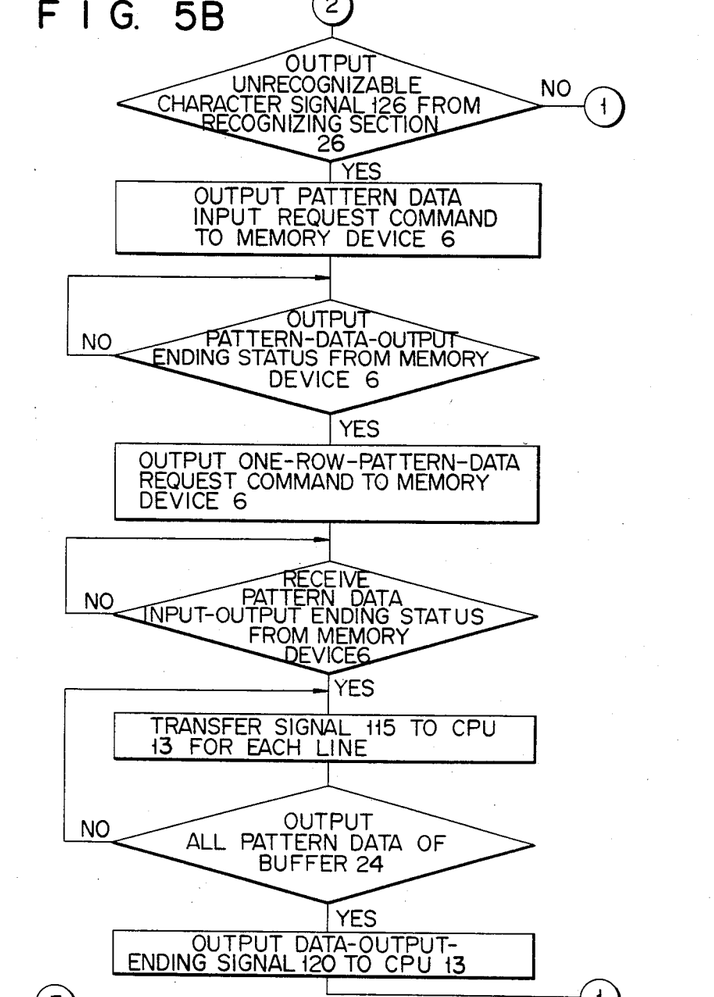
Figure 5C:
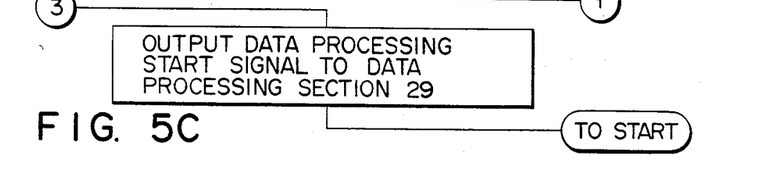
Figure 6:
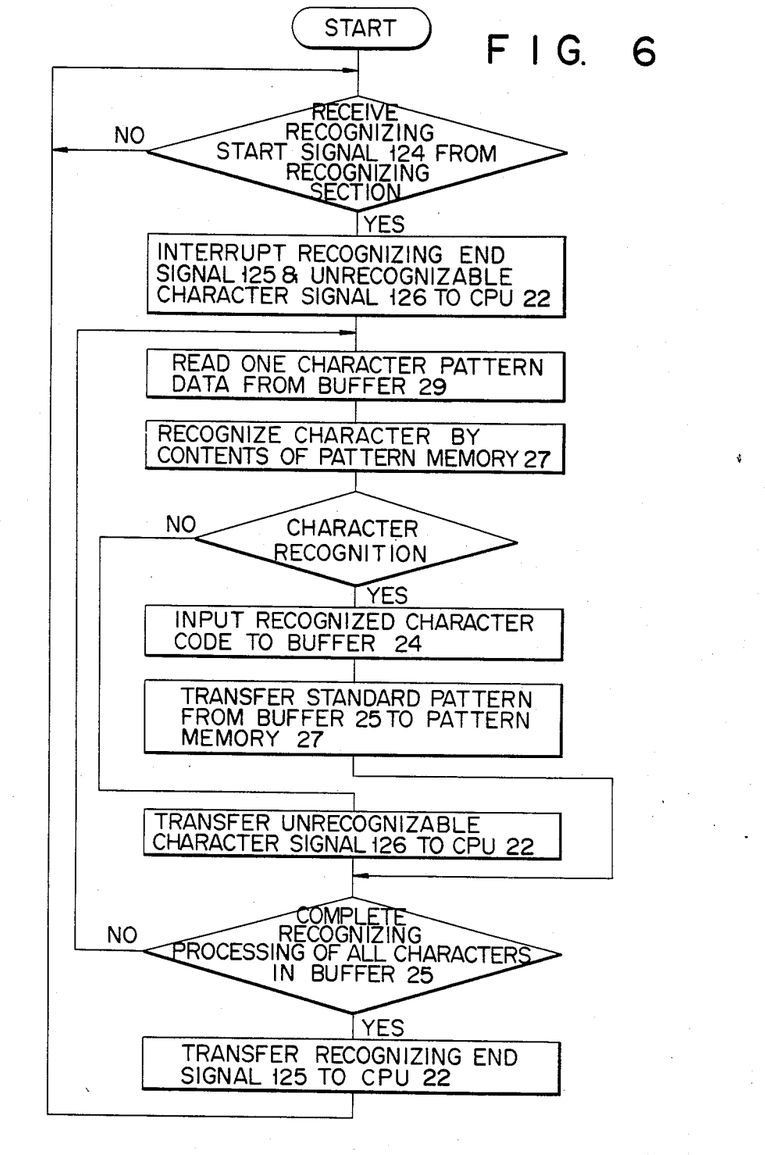
Figure 7:
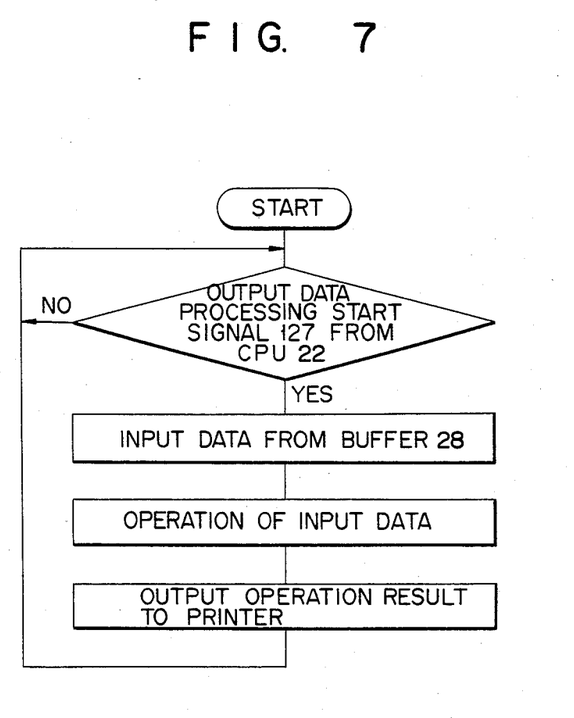

While in the above embodiment the pattern data is transferred and recognized every one line and the document data on the line having an unrecognizable character is printed out, this data may be transferred and recognized every page and the pattern data on the page having the unrecognizable character are printed out together with an index code as shown in FIG. 3C. In this case, a buffer memory having a memory capacity capable of storing the pattern data of one page is used for the buffer 25 for the recognition data. The recognition code is used for each document and is a page number.

What is claimed is:

1. A character recognition facsimile system comprising:
   receiving means for receiving facsimile signals representing a document pattern, said document pattern including a plurality of input character patterns;

first memory means, responsive to said facsimile signals, for storing said plurality of input patterns in the form of associated input character pattern data;

second memory means for storing a plurality of standard character patterns in the form of standard character pattern data;

recognizing means for comparing said input pattern data stored in said first data memory means with said standard pattern data stored in said second memory means, for rewriting the input character pattern data stored in said first memory means associated with input patterns corresponding to said standard patterns with stored standard character pattern data associated with said corresponding standard patterns, and for permitting the stored input pattern data associated with input patterns not corresponding to one of said plurality of standard patterns to remain in said first memory means; and means for printing the character patterns associated with the pattern data stored in said first memory means, wherein said printing means prints out a document pattern of one page containing said non-corresponding input patterns, together with an index code locating said non-corresponding input pattern in said document pattern.

2. A character recognition facsimile system according to claim 1, wherein said first memory means includes buffer memory means for storing input character pattern data associated with one page of said document pattern.

3. A character recognition facsimile system according to claim 1, wherein said first memory means includes main memory means for storing the character pattern data associated with input character patterns of a plurality of document patterns and buffer memory means for sequentially transferring character pattern data associated with one page of said document pattern derived from said main memory means to said recognizing means.

4. A character recognition facsimile system according to claim 3, wherein said printing means prints out the character patterns associated with all of the input character pattern data compared with said standard pattern data by said character recognizing means.

5. A character recognition facsimile system comprising:

receiving means for receiving facsimile signals representing a document pattern, said document pattern including a plurality of input character patterns;

first memory means, responsive to said facsimile signals, for storing said plurality of input patterns in the form of associated input character pattern data;

second memory means for storing a plurality of standard character patterns in the form of standard character pattern data;

recognizing means for comparing said input pattern data stored in said first data memory means with said standard pattern data stored in said second memory means, for rewriting the input character pattern data stored in said first memory means associated with input patterns corresponding to said standard patterns with stored standard character pattern data associated with said corresponding standard patterns, and for permitting the stored input pattern data associated with input patterns not corresponding to one of said plurality of standard patterns to remain in said first memory means; and means for printing the character patterns associated with the pattern data stored in said first memory means, wherein said printing means prints out a document pattern of one line containing said non-corresponding input patterns, together with an index code locating said non-corresponding input pattern in said document pattern.

6. A character recognition facsimile system according to claim 5, wherein said first memory means includes buffer memory means for storing input character pattern data associated with one line of said document pattern.

7. A character recognition facsimile system comprising:

receiving means for receiving facsimile signals representing a document pattern, said document pattern including a plurality of input character patterns;

first memory means, responsive to said facsimile signals, for storing said plurality of input patterns in the form of associated input character pattern data;

second memory means for storing a plurality of standard character patterns in the form of standard character pattern data;

recognizing means for comparing said input pattern data stored in said first data memory means with said standard pattern data stored in said second memory means, for rewriting the input character pattern data stored in said first memory means associated with input patterns corresponding to said standard patterns with stored standard character pattern data associated with said corresponding standard patterns, and for permitting the stored input pattern data associated with input patterns not corresponding to one of said plurality of standard patterns to remain in said first memory means; and means for printing the character patterns associated with the pattern data stored in said first memory means, wherein said receiving means includes means for receiving a facsimile signal representing document patterns of a plurality of documents and means for converting said facsimile signal into said input character pattern data, said input data containing index codes of said documents.

8. An apparatus for processing transmitted information comprising:

receiving means for receiving indicia of at least one input character pattern;

first memory means for storing said received indicia;

second memory means for storing indicia of a plurality of standard character patterns;

processing means, operatively connected to said first and second memory means, for:

comparing said stored indicia of said standard patterns with said indicia of said input pattern to find a standard pattern corresponding to said input pattern, and rewriting said indicia of said input pattern stored in said first memory means with the indicia of a corresponding standard pattern if such a corresponding standard pattern is found; and means for displaying on a display the character patterns the indicia of which are stored in said first memory means, said displaying means including means for creating a permanent record of said display, wherein said processing means also produces indicia of the location, on said display, of input patterns not corresponding to one of said standard patterns.

9. An apparatus as in claim 8 wherein said record creating means includes means for printing said character patterns the indicia of which are stored in said first memory means.

10. An apparatus as in claim 8 wherein said display means includes means for displaying said location indicia.

11. An apparatus as in claim 8 wherein said receiving means includes means for receiving indicia of a plurality of said input character patterns, said plurality of input patterns collected into a document, said document comprising at least one page, said page comprising at least one input character pattern.

12. An apparatus as in claim 11 wherein said first memory means includes buffer storage means for storing indicia of the input patterns comprising a page.

13. An apparatus for processing transmitted information comprising:
  receiving means for receiving indicia of at least one input character pattern;
  first memory means for storing said received indicia;
  second memory means for storing indicia of a plurality of standard character patterns;
  processing means, operatively connected to said first and second memory means, for:
    comparing said stored indicia of said standard patterns with said indicia of said input pattern to find a standard pattern corresponding to said input pattern, and
    rewriting said indicia of said input pattern stored in said first memory means with the indicia of a corresponding standard pattern if such a corresponding standard pattern is found; and
  means for displaying on a display the character patterns the indicia of which are stored in said first memory means, said displaying means including means for creating a permanent record of said display,
  wherein said receiving means includes means for receiving indicia of a plurality of said input character patterns, said plurality of input patterns collected into a document, said document comprising at least one page, said page comprising at least one input character pattern, and
  wherein said processing means also produces indicia of the location on said page of input patterns not corresponding to a standard pattern.

14. An apparatus as in claim 13 wherein said display means includes means for displaying said location indicia.

15. An apparatus as in claim 13 wherein said receiving means includes means for receiving indicia of a plurality of said input character patterns, said plurality of input patterns collected into a document, said document comprising at least one page, said page comprising at least one line, said line comprising at least one input character pattern.

16. An apparatus as in claim 15 wherein said first memory means includes buffer storage means for storing indicia of the input patterns comprising a line.

17. An apparatus for processing transmitted information comprising:
  receiving means for receiving indicia of at least one input character pattern;
  first memory means for storing said received indicia;
  second memory means for storing indicia of a plurality of standard character patterns;
  processing means, operatively connected to said first and second memory means, for:
    comparing said stored indicia of said standard patterns with said indicia of said input pattern to find a standard pattern corresponding to said input pattern, and
    rewriting said indicia of said input pattern stored in said first memory means with the indicia of a corresponding standard pattern if such a corresponding standard pattern is found; and
  means for displaying on a display the character patterns the indicia of which are stored in said first memory means, said displaying means including means for creating a permanent record of said display,
  wherein said receiving means includes means for receiving indicia of a plurality of said input character patterns, said plurality of input patterns collected into a document, said document comprising at least one page, said page comprising at least one line, said line comprising at least one input character pattern, and
  wherein said processing means also produces indicia of the location on said line of input patterns not corresponding to a standard pattern.

18. An apparatus as in claim 17 wherein said display means includes means for displaying said location indicia.

19. A method for processing transmitted information comprising:
  receiving indicia of at least one input character pattern;
  storing said received indicia in a memory;
  comparing indicia of a plurality of standard character patterns with said indicia of said input pattern to find a standard pattern corresponding to said input pattern;
  rewriting said indicia of said input pattern stored in said memory with the indicia of a corresponding standard pattern if such a corresponding standard pattern is found;
  displaying on a display the character patterns the indicia of which are stored in said memory, said displaying step including the step of creating a permanent record of said display; and
  producing indicia of the location, on the display produced by said displaying step, of input patterns not corresponding to one of said standard patterns.

20. A method as in claim 19 wherein said record creating step includes the step of printing said character patterns the indicia of which are stored in said memory.

21. A method as in claim 19 wherein said displaying step includes the step of displaying said location indicia.

22. A method as in claim 19 wherein said receiving step receives indicia of a plurality of said input character patterns, said plurality of input patterns collected into a document, said document comprising at least one page, said page comprising at least one input character pattern.

23. A method as in claim 22 wherein said received indicia storing step includes the step of storing indicia of the input patterns comprising one page in a buffer storage.

24. A method as in claim 19 wherein said receiving step receives indicia of a plurality of said input character patterns, said plurality of input patterns collected into a document, said document comprising at least one page, said page comprising at least one line, said line comprising at least one input character pattern.

25. A method as in claim 24 wherein said received indicia storing step includes the step of storing indicia of the input patterns comprising a line into a buffer storage.

26. A method as in claim 19 wherein said record creating step includes the step of printing said character patterns the indicia of which are stored in said memory and said location indicia.

27. A method for processing transmitted information comprising:
   receiving indicia of at least one input character pattern;
   storing said received indicia in a memory;
   comparing indicia of a plurality of standard character patterns with said indicia of said input pattern to find a standard pattern corresponding to said input pattern;
   rewriting said indicia of said input pattern stored in said memory with the indicia of a corresponding standard pattern if such a corresponding standard pattern is found;
   displaying on a display the character patterns the indicia of which are stored in said memory, said displaying step including the step of creating a permanent record of said display,
   wherein said receiving step receives indicia of a plurality of said input character patterns, said plurality of input patterns collected into a document, said document comprising at least one page, said page comprising at least one input character pattern,
   wherein said received indicia storing step includes the step of storing indicia of the input patterns comprising one page in a buffer storage, and
   producing indicia of the location on said page of input patterns not corresponding to a standard pattern.

28. A method as in claim 27 wherein said display step includes the step of displaying said location indicia.

29. A method for processing transmitted information comprising:
   receiving indicia of at least one input character pattern;
   storing said received indicia in a memory;
   comparing indicia of a plurality of standard character patterns with said indicia of said input pattern to find a standard pattern corresponding to said input pattern;
   rewriting said indicia of said input pattern stored in said memory with the indicia of a corresponding standard pattern if such a corresponding standard pattern is found;
   displaying on a display the character patterns the indicia of which are stored in said memory, said displaying step including the step of creating a permanent record of said display; and
   producing indicia of the location on said line of input patterns not corresponding to a standard pattern,
   wherein said receiving step receives indicia of a plurality of said input character patterns.

30. A method as in claim 29 wherein said display step further includes the step of displaying said location indicia.

31. A method as in claim 29 wherein said display step further includes the step of printing said location indicia.

* * * * *